United States Patent
Granberg

(10) Patent No.: US 6,353,740 B1
(45) Date of Patent: Mar. 5, 2002

(54) METHOD AND ARRANGEMENT IN A MOBILE COMMUNICATIONS SYSTEM

(75) Inventor: Christer Granberg, Stockholm (SE)

(73) Assignee: Telefonaktiebolaget LM Ericcson (publ), Stockholm (SE)

( * ) Notice: Subject to any disclaimer, the term of this patent is extended or adjusted under 35 U.S.C. 154(b) by 0 days.

(21) Appl. No.: 09/079,851

(22) Filed: May 15, 1998

(30) Foreign Application Priority Data

May 23, 1997 (SE) ................................................ 9701933

(51) Int. Cl.$^7$ ................................................ H04Q 7/20
(52) U.S. Cl. .................. 455/432; 455/433; 455/461; 455/456
(58) Field of Search ................................. 455/432, 433, 455/414, 417, 552, 426, 461

(56) References Cited

U.S. PATENT DOCUMENTS

| | | | | |
|---|---|---|---|---|
| 5,839,076 A | * | 11/1998 | Becher | 455/461 |
| 5,901,352 A | * | 5/1999 | St-Pierre et al. | 455/426 |
| 5,905,954 A | * | 5/1999 | Nguyen | 455/433 |
| 5,915,220 A | * | 6/1999 | Chelliah | 455/435 |
| 5,920,820 A | * | 7/1999 | Qureshi et al. | 455/461 |
| 5,943,619 A | * | 8/1999 | Coyne et al. | 455/433 |
| 5,991,621 A | * | 11/1999 | Alperovich | 455/433 |
| 6,002,931 A | * | 12/1999 | Yamaguchi et al. | 455/433 |
| 6,101,387 A | * | 8/2000 | Granberg et al. | 455/433 |
| 6,122,510 A | * | 9/2000 | Granberg | 455/433 |

OTHER PUBLICATIONS

"Digital Cellular Telecommunications System (Phase 2 +): Customized Applications for Mobile Network Enhance Logic", GSM Technical Specification 03.78, ETSI TI–SMG, Mar. 1997.
"CAP Version", Tdoc SMG3 96C324, ETSI STC SMG3, WPC Camel ad–hoc, DeTeMobil, Oct. 21–23, 1996.
Smith, David G. "An Introduction to GSM Enhancements for Operator Specific Services (CAMEL)", Colloquium on communications Towards the next Millenium, May 1996.

* cited by examiner

Primary Examiner—Nay Maung
Assistant Examiner—Temica M. Davis
(74) Attorney, Agent, or Firm—Burns, Doane, Swecker & Mathis, L.L.P.

(57) ABSTRACT

A method and an arrangement of functional entities in a mobile telecommunications system for supporting to a mobile subscriber a second set of operator specific services (OSS+), having a high level of functionality, additional to services standardized in the system. A first set of operator specific services (OSS), with a lower level of functionality, is supposed to already be provided for in the system. The second set of services (OSS+) is provided for by a telecommunications standard different from the standard which provides the first set of services (OSS) and is preferably a structured standard for mobile telecommunication. The second set of services (OSS+) is triggered by an intelligent network capability indicator, that is included in a subscription information field stored for each subscriber in a subscriber database.

8 Claims, 3 Drawing Sheets

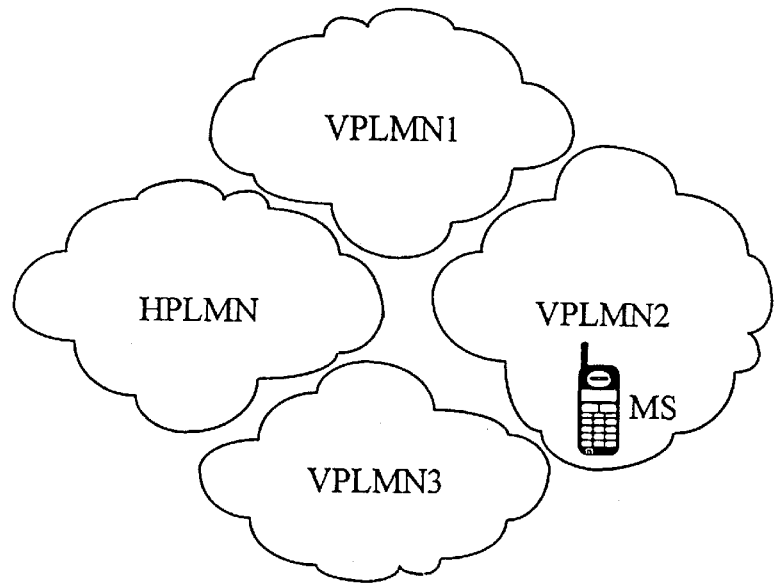
Fig. 3
| HLR | | | | | | | | |
|---|---|---|---|---|---|---|---|---|
| Subscr. | Data | | | | | | | /—400 |
| ⋮ | ⋮ | | | | | | | |
| #x | IMSI | MSISDN | CAT | STAT | ------ | O-CSI | T-CSI | VLR ID |
| ⋮ | | | | | | | | |
Fig. 4
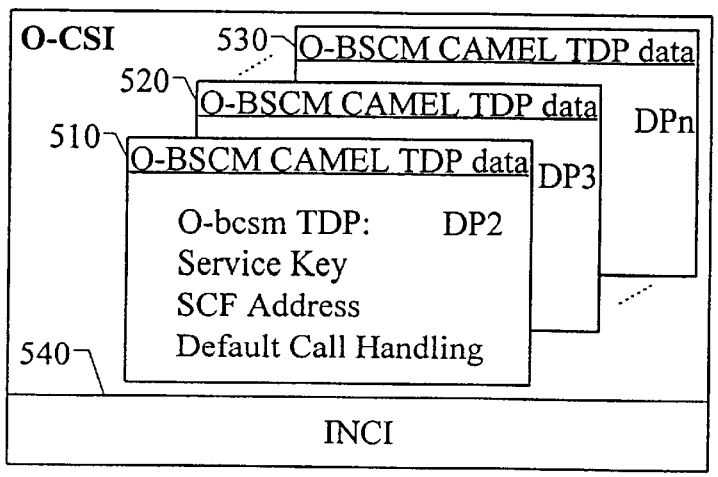
Fig. 5

METHOD AND ARRANGEMENT IN A MOBILE COMMUNICATIONS SYSTEM

This application claims priority under 35 U.S.C. §§119 and/or 365 to SE 9701933-5 filed in Sweden on May 23, 1997; the entire content of which is hereby incorporated by reference.

FIELD OF INVENTION

The present invention relates to a method in a mobile telecommunications system of supporting operator specific services additional to services standardized in the system. In particular the invention relates to a method of supporting additional operator specific services, according to a second telecommunications standard, in a system, which already provides such operator specific services according to a first telecommunications standard.

The invention also relates to an arrangement of functional entities in a mobile telecommunications system through which operator specific services additional to services standardized in the system are supported to a mobile subscriber.

DESCRIPTION OF THE PRIOR ART

The present invention is based upon the emerging CAMEL standard (Customised Applications for Mobile network Enhanced Logic), which is part of the GSM (Global System for Mobile communication), Phase 2+ standard that is currently being specified by SMG (Special Mobile Group) TC (Technical Committee) of ETSI (European Telecommunications Standards Institute). The main object of CAMEL is to support operator specific services, which are not covered by standardized GSM services to a mobile subscriber, even when the mobile subscriber is roaming outside the HPLMN (Home Public Land Mobile Network), i.e. to specify therefor required inter-network interfaces and underlying networks. The CAMEL feature is not a supplementary service, but a network feature to help the network operator. It is, however, also possible to deploy CAMEL for intra-network usage and to use the part of the CAMEL feature being supported by HLR (Home Location Register), MSC/VLR (Mobile services Switching Centre/Visitor Location Register) and GMSC (Gateway MSC) for invocation of IN (Intelligent Network) based services, which are triggered in a SSF (Service Switching Function) being integrated with the MSC or GMSC, and for routing to stand-alone SSPs (Service Switching Point) and service nodes in the mobile telecommunications system.

Below follows a listing of definitions made in the CAMEL standard, which are relevant to the disclosure of the present invention.

gsmSSF (GSM Service Switching Function)
  gsmSSF is a functional entity that interfaces the MSC/GMSC to the gsmSCF. The concept of the gsmSSF is derived from the above mentioned SSF, but uses different triggering mechanisms because of the nature of the mobile network. The gsmSSF of today does not support quite many IN services as the SSF.

gsmSCF (GSM Service Control Function)
  gsmSCF is a functional entity that contains the CAMEL service logic to implement OSS (Operator Specific Service), which interfaces with the gsmSSF and the HLR.

gsmSCF Address
  gsmSCF Address is an address to be used in order to access the gsmSCF for a particular subscriber. The gsmSCF Address is an E164 number of up to 15 digits.

BCSM (Basic Call State Model)
  The BCSM provides a high-level model of GMSC- or MSC/VLR-activities required to establish and maintain communication paths for mobile subscribers. As such, it identifies a set of basic call activities in a GMSC or MSC/VLR and shows how these activities are joined together to process a basic call.

DP (Detection Point)
  A DP is a point in processing at which a notification to the service logic can occur and transfer of control to the gsmSCF is possible.

O-BCSM (Originating Basic Call State Model)
  The O-BCSM is the originating half of the BCSM and thus the portion of the BCSM, which is associated with the originating party.

T-BCSM (Terminating Basic Call State Model)
  T-BCSM is the terminating half of the BCSM. The T-BCSM corresponds to that portion of the BCSM, which is associated with the terminating party.

O-CSI (Originating CAMEL Subscription Information)
  The O-CSI identifies a subscriber as having originating CAMEL services.

T-CSI (Terminating CAMEL Subscription Information)
  The T-CSI identifies a subscriber as having terminating CAMEL services.

In FIG. 1 is illustrated how a gsmSCF 110 according to a known procedure interacts with a O-BSCM 120, in for instance a MSC, and a T-BSCM 130, in for instance a GMSC, via DPs DP1–DPn; DP12–DPm and gsmSSFs 140; 150. Particular detection points DP2, DPn DP12 and DPm are so called TDPs (Trigger Detection Point), which constitute points in the call progress where triggering of an OSS may occur. A set of TDP data is a collection of such points, that corresponds to a certain set of OSSs. In the present version of the CAMEL standard (CAMEL ph1) is only DP2 used for O-CSI and DP12 for T-CSI. Communication between the gsmSCF 110 and the gsmSSFs 140; 150 is carried out according to a CAP (CAMEL Application Part) protocol, which basically is a sub-set of the INAP (Intelligent Network Application Part) protocol.

PIC (Point in Call)
  A PIC identifies a MSC/VLR or GMSC activity, which is associated with one or more basic call/connection states of interest to OSS service logic instances.

Location Information
  Location Information indicates the location of a served mobile subscriber. The provision of location information is independent of the mobile station's status. As part of the location information, is delivered an indication of the age of the information.

Service Key
  A Service Key identifies to the gsmSCF a service logic that should apply for a particular mobile subscriber. The Service Key is administered by the HPLMN, and is passed transparently by the VPLMN/IPLMN (Visiting PLMN/Interrogating PLMN) to the gsmSCF in the current PLMN of the subscriber. The Service Key is part of the O/T-CSI.

Subscriber State
  Subscriber State indicates the status of the mobile station associated with a certain subscriber. Possible states are: (1) CAMEL Busy, which means that the mobile station is engaged on a transaction for a mobile originated or terminated circuit-switched call, (2) Network Determined Not Reachable, which indicates that the communications network can determine from its internal data that the mobile station is not reachable and (3) Assumed Idle, corresponding to the mobile station being neither CAMEL Busy nor Network Determined Not Reachable.

Default Call Handling

The Default Call Handling indicates whether a call shall be released or continued as requested in case of error in the gsmSSF to gsmSCF dialogue.

Through GSM Technical Specification 03.78, ETSI TC-SMG, March 1997, "Digital cellular telecommunications system (Phase 2+); Customised Applications for Mobile network Enhanced Logic" is previously known an architecture for functional entities, HLR, gsmSCF, gsmSSF, GMSC, VLR and MSC, which support the CAMEL feature. The architecture also defines the telecommunications protocols to be used between said functional entities.

In TDoc SMG3 96C324, ETSI STC SMG3-WPC Camel ad-hoc, DeTeMobil, Oct. 21–23, 1996, "CAP Version" is taught a method of deciding which of two possible CAP-versions (CAMEL Application Part) that shall be used for transmission of data between two of the CAMEL specified functional entities, gsmSCF and gsmSSF. The proposed solution implies introduction of a parameter in the data structure containing information for the trigger DPs being defined in the CSI (CAMEL Subscription Information). The parameter may also be used as an indication whether or not a national INAP (Intelligent Network Application Part) should be used instead.

However, if multiple trigger DPs are applied to describe the required support for a specific mobile subscriber's operator specific services and the CAP versions differ between at least two of the trigger DPs, this procedure will cause an implementation conflict. Besides this, definition of a later CAP version than can be supported in the PLMN in which the mobile subscriber currently is roaming, results in the corresponding services being impossible to support.

SUMMARY OF THE INVENTION

The present invention is applicable in a mobile telecommunications system, like GSM. Nevertheless, the invention is not limited to GSM, but may be carried out in any mobile telecommunications system, which supports operator specific services. The invention provides to a mobile subscriber in the system support for a set of operator specific services, additional to the standardized services in the system. The set of operator specific services is accommodated by a structured IN standard, such as CS1 (Capability. Set 1), and offered to the mobile subscriber when roaming in its HPLMN or a VPLMN having equal or better capabilities. Furthermore, the method according to the invention implies that a set of additional operator specific services already is provided for in the system, through a different telecommunications standard, like for instance the CAMEL phi standard.

Expansion of the set of operator specific services according to the method disclosed in TDoc SMG3 96C324, ETSI STC SMG3-WPC Camel ad-hoc, DeTeMobil, Oct. 21–23, 1996, "CAP Version" may cause insoluble protocol conflicts in the communications network. Moreover, inter-working between network equipment from different suppliers is presently impossible to accomplish, since the additional set(s) of operator specific services are not implemented in a standardized manner. An operator will, for instance, therefore be forced to implement and administer different mechanisms for a subscriber, whose services are based on a structured IN standard (like CS1) in the HPLMN and on a OSS standard (such as CAMEL ph1) when roaming.

One purpose of the present invention is thus to provide operator specific services additional to the services standardized in a mobile telecommunications system, whereby no protocol conflicts will occur.

Another purpose of the present invention is to facilitate inter-working between network equipment from different suppliers in a mobile telecommunications system, when better service capabilities are requested than what can be provided by the standardized services in system.

According to a first embodiment of the inventive method information indicating the required support for a first set of operator specific services, which have a functionality provided by a first telecommunications standard, is specified for each subscriber in the mobile telecommunications system. This information is recorded in one or more subscription information fields and stored in a subscriber database. A second set operator specific services, with a functionality provided by a second telecommunications standard—different from the first standard—is also supported to the mobile subscribers, when they are roaming in their HPLMN or a VPLMN having equal or better capabilities. This is accomplished by extending the subscription information field with an intelligent network capability indicator for each subscriber, that requests at least one operator specific service, comprised in the second set of services. The intelligent network capability indicator indicates that a particular intelligent network functionality shall be invoked, which supports the second set of operator specific services.

According to one advantageous embodiment of the inventive method data, defining the intelligent network functionality of the second set of operator specific services, is sent from the subscriber database to the PLMN in which the mobile subscriber currently is roaming. This data is only sent when the subscriber requests one of the operator specific services in the second set. The data is directed to the functional entities that are involved in execution of the particular service. Typically, the data is sent to a GMSC when the subscriber receives a terminating call and to a VLR when the subscriber registers in a particular MSC/VLR.

According to another preferred embodiment of the inventive method, a set of trigger detection point data, which is included in the subscription information field comprises at least one detection point, which supports the second set of operator specific services.

The proposed arrangement of functional entities (such as e.g. HLR, GMSC, VLR, MSC, SCF and SSF) supports a second set of additional operator specific services, with a functionality provided by a second telecommunications standard, to mobile subscribers in a mobile telecommunications system, already providing a first set of operator specific services to its subscribers. The second set of services is available to a certain subscriber at least while being located within the part of the system, which is served by the operator with whom he/she has his/her subscription, i.e. in the HPLMN. Possibly, the second set of services is also available to the subscriber when he/she is roaming in a network, having capabilities equal to or better than the HPLMN, that is served by an operator with which the HPLMN operator has a service agreement. The second set of services is realized by the functional entities and the communications between those entities is carried out in accordance with a structured IN protocol, like the CS1 standard. Likewise can of course any proprietary enhancement of the CS1 standard also be used, as well as subsequent versions of the Capability Set standard (CS2, CS3 etc.).

The present invention offers to a mobile subscriber in the HPLMN-part of any mobile telecommunications system, which supports operator specific services, additional services with a functionality provided by a structured IN.

The structured IN standard in its turn facilitates the inter-working between network equipment from different suppliers in a mobile telecommunications system. Hence, the invention makes it easy to combine network equipment from different suppliers both within a particular PLMN and between different PLMNs.

BRIEF DESCRIPTION OF THE DRAWINGS

FIG. 3 shows a group of PLMNs in which a mobile subscriber may roam and have access to different sets of services depending upon which PLMN he/she is connected to;

FIG. 4 depicts a known subscriber data structure stored in a subscriber database;

FIG. 5 depicts an arrangement of a per se known originating CAMEL subscription information field extended with an INCI field according to the invention;

The invention will now be described in more detail with reference to preferred exemplifying embodiments thereof and also with reference to the accompanying drawings.

DESCRIPTION OF PREFERRED EMBODIMENTS

Figure 1:
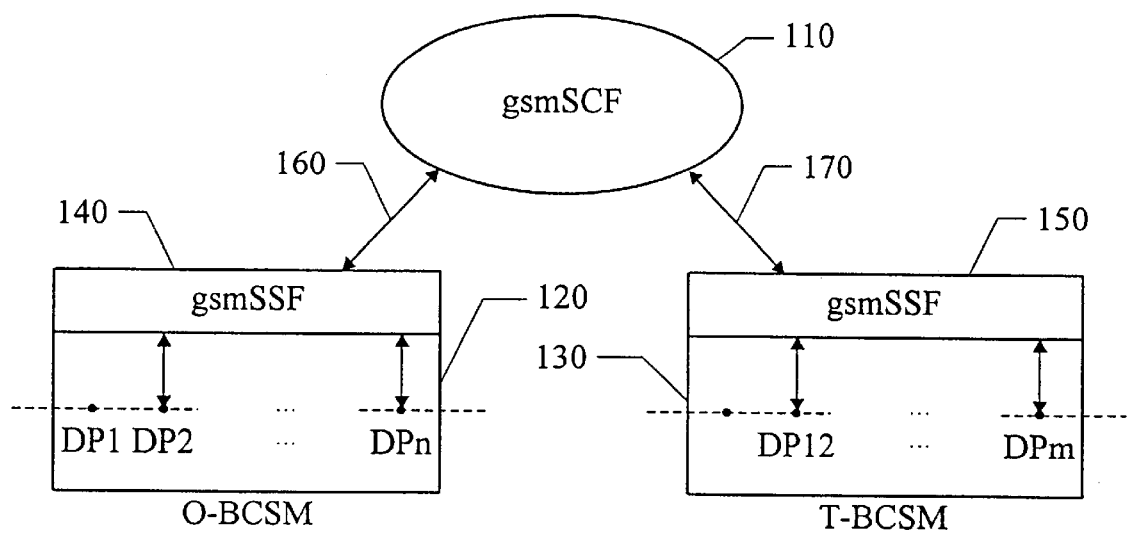
FIG. 1 illustrates a known procedure for the gsmSCF's interaction with the O-BSCM and the T-BSCM.
Figure 2:
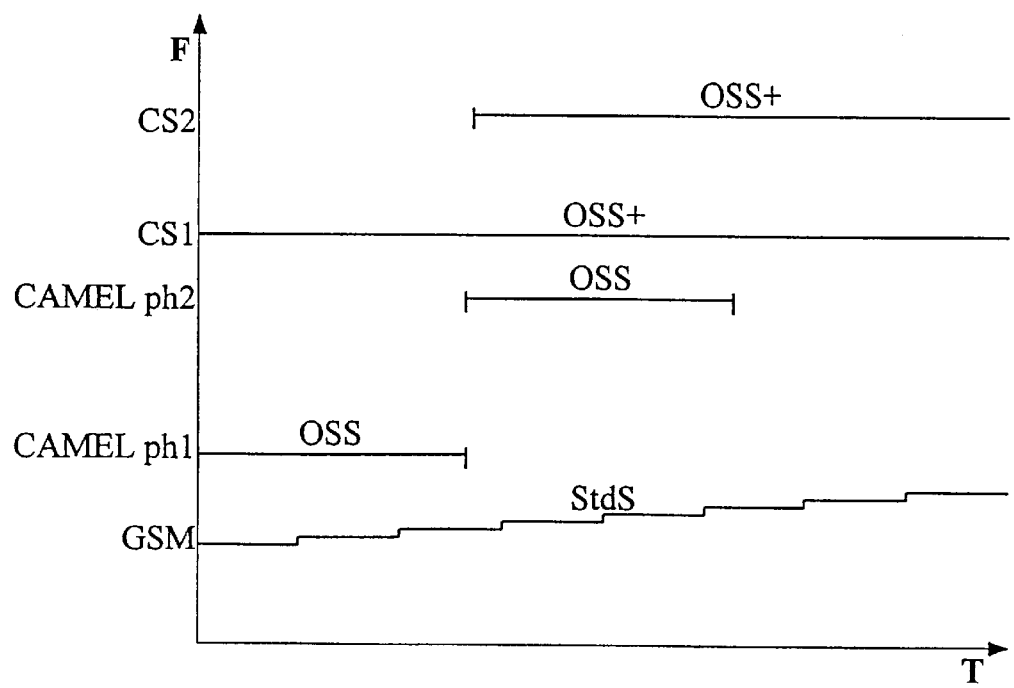
FIG. 2 shows a diagram over a known relationship between the functionality levels of different communications standards.

A diagram in FIG. 2 illustrates a known relationship between functionality levels of different telecommunications standards. Along the vertical axis is indicated the level of functionality F while the horizontal axis shows the time dimension T. A functionality F provided by standardized services in a mobile telecommunications system is represented by a first graph StdS, which in this case is exemplified by the GSM standard. A second and a third graph OSS represent functionalities F of a first set of operator specific services, which are supported by a first CAMEL ph1 and a second CAMEL ph2 version of a particular first telecommunications standard. A second set of operator specific services, having a different and a somewhat higher level of functionality F is represented by a fourth graph OSS+. The second set of operator specific services OSS+ is provided to the subscribers in the mobile telecommunications system by a second telecommunications standard CS1, which here is exemplified by the Capability Set 1 standard. Yet higher degrees of functionality F may be provided by later versions CS2 of the Capability Set standard. This is illustrated with a fifth graph OSS+.

The Capability Set 1 standard CS1 is the initial realization of the ITU-T IN architecture. It is intended to support viable services on current technology, while providing a foundation of experience for the development of subsequent capability sets. CS1 defines the basic signalling entities and the interfaces between them in an IN structured network. An application and service independent INAP protocol is used to define the interfaces. CS1 also defines a set of IN services, service features and SIBs (Service Independent Building block) Generally, services consist of service features, which can independently function as full services. CS1 defines 14 different SIBs, from which service features, and thereby services, can be constructed.

Due to the non-interoperability of different ITU-T CS1 INAP implementations and the subsequent dissatisfaction among IN equipment vendors with these implementations, ETSI has defined a subset of the CS1 interfaces, called Core INAP. This specification is now widely accepted as the basis for interoperable IN systems. Core INAP defines the standard interfaces between signalling entities in an IN structured telecommunications network.

Returning to the functionality levels of services provided by the different telecommunications standards mentioned above, is below listed some examples of standardized supplementary services in GSM; Call Forwarding (Unconditional, on Subscriber Busy, on No Reply or on MS Not Reachable), Barring (of all Outgoing Calls, of all Outgoing International Calls, of all Outgoing International Calls Except those Directed to the HPLMN Country, of all Incoming Calls or of all Incoming Calls when Roaming Outside HPLMN), Call Hold and Call Waiting. The following services constitute examples of operator specific services, which are supported by the CAMEL ph1 standard; Private Numbering Plan, Short Number Dialling, Incoming Call Screening, Location Dependent Routing and Flexible Operator Determined Barring.

Services that can be supported by a structured IN standard, like CS1 or proprietary enhancements thereof, may be exemplified by: Pre-paid services, Virtual Private Network, Personal Number, On-line Charging Services, Mobile Access Hunting, Flexible Call Forwarding and Fraud Prevention Mechanisms.

A group of PLMNs HPLMN, VPLMN1–VPLMN3, in which a mobile subscriber MS may roam and have access to different services, depending upon within which network he/she currently is located, is shown in FIG. 3. The mobile subscriber MS has a subscription in a first network HPMLN. In this network the subscriber MS has access to a highest level of service functionality. A set of operator specific services is here supported to the subscriber MS via a structured standard for mobile telecommunication, such as the MAP v.3 standard. If a roaming network VPLMN2 has capabilities equal to or better than the subscriber's HPLMN and the HPLMN operator has a service agreement with the operator in the roaming network VPLMN2, the subscriber can be provided with the services of the same functionality level as in his/her home network HPLMN. In networks VPLMN1, VPLMN3 where the capabilities are lower than in the subscriber's home network HPLMN and/or if there is no agreement between the network operators the mobile subscriber MS will only have access to operator specific services, which are supported by a standard that is common to all of the networks HPLMN, VPLMN1–VPLMN3, such as e.g. the CAMEL ph1 standard.

A known manner of structuring subscriber data 400 in a subscriber database HLR (Home Location Register) in a mobile telecommunications system operating according to the GSM standard is shown in FIG. 4. For each subscriber in the mobile telecommunications system is listed a data set, which describes the particular subscription #x. One field IMSI in the data set indicates the International Mobile Subscriber Identity. Other fields MSISDN, CAT and STAT stores the Mobile Station ISDN (Integrated Services Digital Network)-number, subscriber category (Ordinary, with Priority, Payphone or Test Phone) and whether Calls are Barred by the operator or if Service is Granted respectively. Two fields O-CSI and T-CSI contain CAMEL specific information elements, which identify the subscription #x as having respectively originating and terminating CAMEL services. In a last field VLR ID is recorded location data identifying a current VLR for the subscriber, which is associated with subscription #x.

FIG. 5 depicts the arrangement of the originating CAMEL subscription information field O-CSI according to the invention. A first set of O-BSCM CAMEL TDP data 510 comprises an originating basic call state model trigger detection point O-bcsm TDP indicating a first detection point DP2 at which point in the progress of a call triggering of an OSS may occur. The list 510 also comprises an identification Service Key to the gsmSCF of a service logic that should apply for the subscriber when roaming, an address SCF Address to be used in order to access the SCF for the subscriber and a parameter Default Call Handling for either releasing or continuing the call in case of error in the gsmSSF to gsmSCF dialogue.

A second set of C-BSCM CAMEL TDP data 520 comprises a second detection point DP3 at which point in the progress of a call triggering of an OSS may occur and a second set of Service Key, SCF Address and Default Call Handling respectively. An arbitrary number of such additional sets of O-BSCM CAMEL TDP data 530 may be included, each set comprising at least one trigger detection point DPn, Service Key, SCF Address and Default Call Handling information.

The originating CAMEL subscription information field O-CSI is extended with a field 540, which comprises an intelligent network capability indicator INCI. The intelligent network capability indicator INCI is used to derive an IN service trigger. The IN service trigger in its turn is used for invoking an SSF integrated in the (G)MSC and to indicate in the SSF the correct set of trigger data for the call. Thus, a capability set required for supporting an additional set of operator specific services is indicated in the intelligent network capability indicator INCI.

Figure 6:
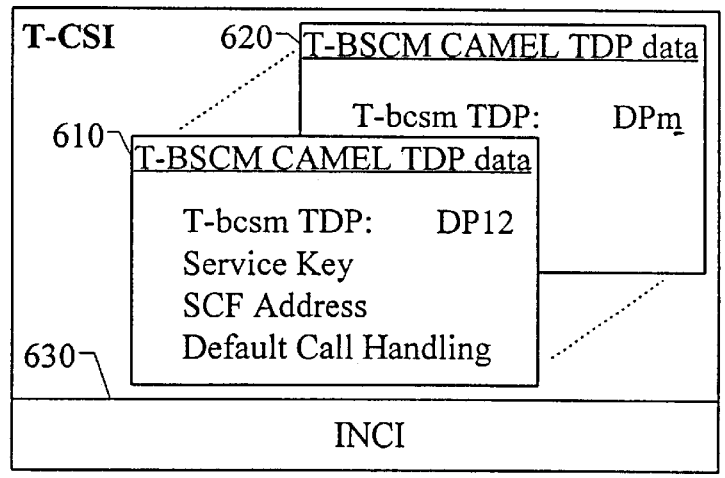
FIG. 6 depicts an arrangement of a per se known terminating CAMEL subscription information field extended with an INCI field according to the invention.

FIG. 6 depicts the corresponding arrangement of the terminating CAMEL subscription information field T-CSI according to the invention. A first set of T-BSCM CAMEL TDP data 610 comprises a terminating basic call state model trigger detection point T-bcsm TDP indicating a first detection point DP12. The list 610 also comprises an identification Service Key to the gsmSCF of a service logic that should apply for the subscriber when roaming, an address SCF Address to be used in order to access the gsmSCF for the subscriber and a parameter Default Call Handling for either releasing or continuing the call in case of error in the gsmSSF to gsmSCF dialogue. An arbitrary number of sets of T-BSCM CAMEL TDP data 620 may be included, where each set comprises at least one trigger detection point DPm, Service Key, SCF Address and Default Call Handling-routine.

The terminating CAMEL subscription information field T-CSI is also extended with a field 630, comprising an intelligent network capability indicator INCI identical with indicator 540 of the originating CAMEL subscription information field O-CSI.

Figure 7:
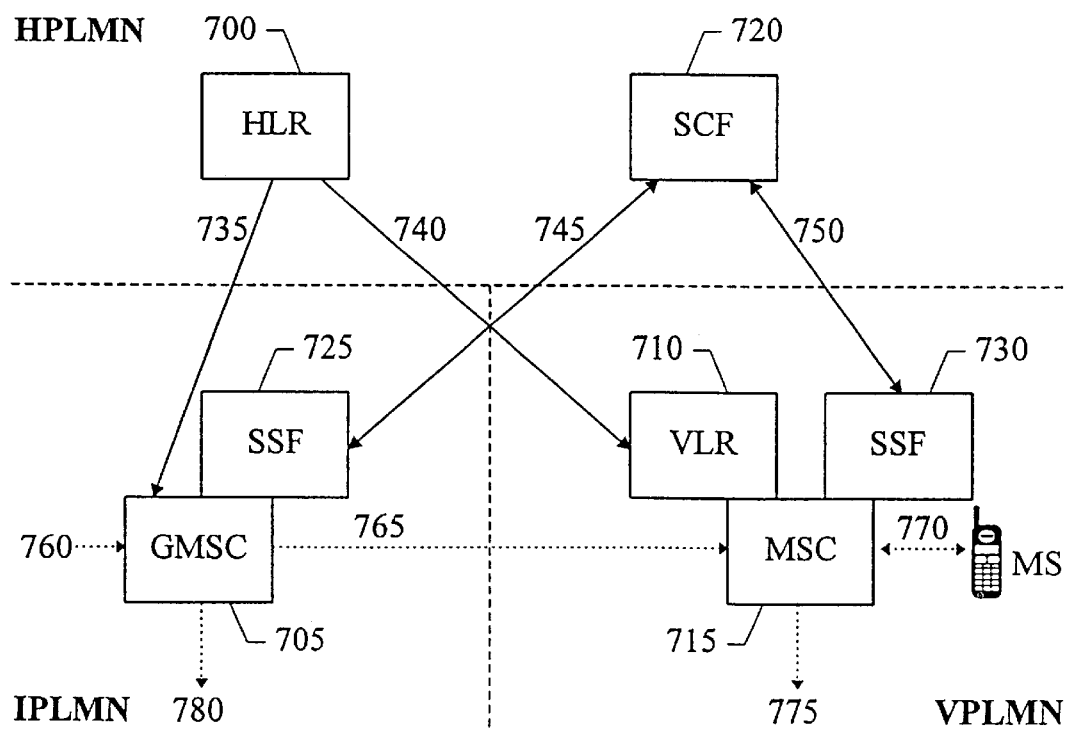
FIG. 7 shows an architecture of functional entities exemplifying the method and the arrangement according to the invention.

FIG. 7 depicts an architecture of functional entities HLR, GMSC, VLR, MSC, SCF and SSF located in a HPLMN, a IPLMN and a VPLMN, which exemplifies the method and the arrangement according to the invention.

The HLR 700 in the HPLMN of a particular mobile subscriber MS stores subscription information O/T-CSI for the subscriber MS, where it is indicated that the subscriber MS requires CAMEL support. In an extension field to the subscription information O/T-CSI is included an intelligent network capability indicator INCI, as described with reference to FIGS. 5 and 6.

The O-CSI 740 part of the subscription information is sent along with the INCI to the VLR 710 of a certain VPLMN in case of a Location Update from this VPLMN or if the subscription information O-CSI is updated in the HPLMN. The information is then stored in the VLR 710 until the subscriber MS leaves the responsibility area VPLMN of the VLR 710. In case of a mobile originated call or a forwarded call 775 a check is performed whether the VLR 710 contains O-CSI and INCI information for the subscriber MS.

The subscriber information O/T-CSI, including the INCI, is sent from the HLR 700 to the GMSC 705 in an IPLMN when the HLR 700 responds to a request for routing information from such an interrogating network. When processing calls for the mobile subscriber MS the GMSC 705 may receive from the HLR 700 an O/T-CSI, including the INCI 735, which directs the GMSC 705 to invoke the SSF 725.

The GMSC 705 also monitors on request events (i.e. call states), informs the SSF 725 of these events during call processing and thereby enables the SSF 725 to control the execution of the call in the GMSC 705.

The information contained in the extended subscription field O-CSI is sent from the HLR 700 to the VLR 710 at location updating 740 as an extension to the MAP (Mobile Application Part) protocol v.3 (version 3) in an operation called Insert Subscriber Data. The O-CSI information is stored in the VLR 710. At a mobile originating or forwarded call 775 from a mobile subscriber MS in VPLMN it is checked whether O-CSI information is stored in the VLR 710. The information contained in the extended subscription field O/T-CSI is sent from the HLR 700 to the GMSC 705 as an extension to the MAP protocol v.3 in an operation named Send Routing Info Response (as a part of terminating call handling). If a call forwarding service is invoked in the HLR 700 and the subscriber MS has specified originating OSSs, then the information of the extended subscription field O-CSI is sent together with a forwarded-to-number from HLR 700 to the GMSC 705.

What is claimed is:

1. Method in a mobile telecommunications system,
    where support for a first set of operator specific services, additional to services standardized in the mobile telecommunications system, is provided to its subscribers according to a first telecommunications standard, and
    where information indicating required support for the first set of operator specific services is specified for each mobile subscriber in at least one subscription information field is stored in a subscriber database, of supporting to a mobile subscriber a second set of operator specific services, having a functionality provided by a second telecommunications standard,
    wherein the subscription information field is extended with an intelligent network capability indicator, which indicates that intelligent network functionality different from the functionality provided by the first telecommunications standard shall be invoked, and that said intelligent network capability indicator supports the second set of operator specific service.

2. Method according to claim 1, wherein data, which defines the intelligent network functionality of the second set of operator specific services, comprised in the intelligent network capability indicator for a specific mobile subscriber, is transmitted from the subscriber database to relevant functional entities in a public land mobile network, in which the mobile subscriber currently is roaming, if at least one of the services comprised in the second set of operator specific service is requested by the mobile subscriber.

3. Method according to claim 2, wherein information relating to one or more originating services is included in one of the subscription information fields.

4. Method according to claim 2 wherein information relating to one or more terminating services is included in one of the subscription information fields.

5. Method according to claim 1, where the subscription information field, includes a set of trigger detection point data comprising a first trigger detection point, which supports the first set of operator specific services, wherein at least one additional set of trigger detection point data is included in the subscription information field, which comprises at least one additional detection point that is different from the first trigger detection point, and that said additional detection point supports the second set of operator specific services.

6. Method according to claim 5, wherein a capability set required for supporting the second set of operator specific services is indicated in the intelligent network capability indicator.

7. Arrangement of functional entities in a mobile telecommunications system comprising:

a first set of operator specific services, additional to services standardized in the system, for subscribers according to a first telecommunications standard, and which first set of operator specific services communicates information between the functional entities according to a standardized protocol, wherein a mobile subscriber in the system is provided with a second set of operator specific services, having a functionality provided by a second telecommunications standard, at least while located within a particular part of the system, and that the standardized protocols are realized by means of a structured standard for mobile telecommunication.

8. A method for providing services to a mobile subscriber in a radiocommunication system comprising the steps of:

providing a first set of operator specific services according to a first telecommunication standard;

specifying information used to support said first set of operator specific services in at least one subscription information field stored in a database;

providing a second set of operator specific services according to a second telecommunication standard different than said first telecommunication standard;

extending said at least one subscription information field by providing an intelligent network capability indicator thereto; and transmitting said intelligent network capability indicator to at least one node in a public land mobile network in which the mobile subscriber is currently roaming when at least one of the services in the second set of operator specific services is requested by said mobile subscriber.

* * * * *